United States Patent
Nonaka

(10) Patent No.: US 7,271,503 B2
(45) Date of Patent: Sep. 18, 2007

(54) POWER SUPPLY CIRCUIT INCLUDING STABLY OPERATING VOLTAGE REGULATORS

(75) Inventor: Yoshihiro Nonaka, Tokyo (JP)

(73) Assignees: NEC Corporation, Tokyo (JP); NEC Electronics Corporation, Kanagawa (JP)

( * ) Notice: Subject to any disclaimer, the term of this patent is extended or adjusted under 35 U.S.C. 154(b) by 464 days.

(21) Appl. No.: 10/842,566

(22) Filed: May 11, 2004

(65) Prior Publication Data

US 2004/0227405 A1    Nov. 18, 2004

(30) Foreign Application Priority Data

May 13, 2003    (JP) .............................. 2003-133840

(51) Int. Cl.
*H02J 1/12*    (2006.01)

(52) U.S. Cl. ............................ 307/45; 368/84; 368/242

(58) Field of Classification Search ................. 368/84, 368/242; 307/45
See application file for complete search history.

(56) References Cited

U.S. PATENT DOCUMENTS

| 4,570,115 A | * | 2/1986 | Misawa et al. ............. 323/313 |
| 5,874,850 A | * | 2/1999 | Pulvirenti et al. .......... 327/536 |
| 6,960,955 B2 | * | 11/2005 | Nonaka ...................... 327/536 |
| 7,019,993 B2 | * | 3/2006 | Vazquez Carazo ........... 363/67 |
| 2001/0048295 A1 | * | 12/2001 | Joch .......................... 323/282 |
| 2003/0057776 A1 | * | 3/2003 | Takase et al. ................. 307/43 |

FOREIGN PATENT DOCUMENTS

JP    2002-189454    7/2002

* cited by examiner

*Primary Examiner*—Michael Sherry
*Assistant Examiner*—Hal I Kaplan
(74) *Attorney, Agent, or Firm*—Young & Thompson

(57) ABSTRACT

A power supply circuit is constructed by a step-up circuit for receiving an input DC voltage to generate a plurality of output DC voltages, and a plurality of voltage regulators, each powered by two voltages selected from a combination of the output DC voltages and the ground voltage. The difference between the two voltages of each of the voltage regulators are substantially the same, to stably operate the voltage regulators.

30 Claims, 9 Drawing Sheets

POWER SUPPLY CIRCUIT INCLUDING STABLY OPERATING VOLTAGE REGULATORS

BACKGROUND OF THE INVENTION

1. Field of the Invention

The present invention relates to a power supply circuit used in a liquid crystal display (LCD) apparatus, for example.

2. Description of the Related Art

Generally, in an LCD apparatus including an LCD panel, a data line (signal line) driver circuit and a gate line (scan line) driver circuit, a power supply circuit is provided to supply regulated voltages to the data line driver circuit and the gate line driver circuit.

In the data line driver circuit, the regulated voltage supplied thereto does not need to be high; however, a high current drive ability is required. Therefore, the regulated voltage is derived from $2 \cdot V_{DD}$, for example, where $V_{DD}$ is the power supply voltage. On the other hand, in the gate line driver circuit, the regulated voltages supplied thereto do not require a high current drive ability; however, the regulated voltages are a sufficiently high voltage and a sufficiently low voltage. Therefore, the regulated voltages are derived from $4 \cdot V_{DD}$ and $(-2) \cdot V_{DD}$, for example. This will be explained later in detail.

A prior art power supply circuit is constructed by a step-up circuit for receiving a power supply voltage $V_{DD}$ to generate a 4-multiple step-up voltage $4 \cdot V_{DD}$, a 2-multiple step-up voltage $2 \cdot V_{DD}$ and a $(-2)$-multiple step-up voltage $(-2) \cdot V_{DD}$, a first voltage regulator powered by the 4-multiple step-up voltage and the ground voltage to generate a first regulated voltage, a second voltage regulator powered by the 2-multiple step-up voltage and the ground voltage to generate a second regulated voltage, and a third voltage regulator powered by the ground voltage and the $(-2)$-multiple step-up voltage. This also will be explained later in detail.

In the above-described prior art power supply circuit, however, the difference between the two power voltages of the first voltage regulator is $4 \cdot V_{DD}$, the difference between the two power voltages of the second voltage regulator is $2 \cdot V_{DD}$, and the difference between the two power voltages of the third voltage regulator is $2 \cdot V_{DD}$. As a result, all of the first, second and third voltage regulators are not always stably operated, or the reliability of some of the voltage regulators may deteriorate.

SUMMARY OF THE INVENTION

It is an object of the present invention to provide a power supply circuit capable of stably operating voltage regulators thereof and improving the reliability.

According to the present invention, a power supply circuit is constructed by a step-up circuit for receiving an input DC voltage to generate a plurality of output DC voltages, and a plurality of voltage regulators, each powered by two voltages selected from a combination of the output DC voltages and the ground voltage. The difference between the two voltages of each of the voltage regulators are substantially the same, to stably operate the voltage regulators.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, a prior art power supply circuit will be explained with reference to FIGS. 1, 2, 3, 4, 5 and 6.

Figure 1:
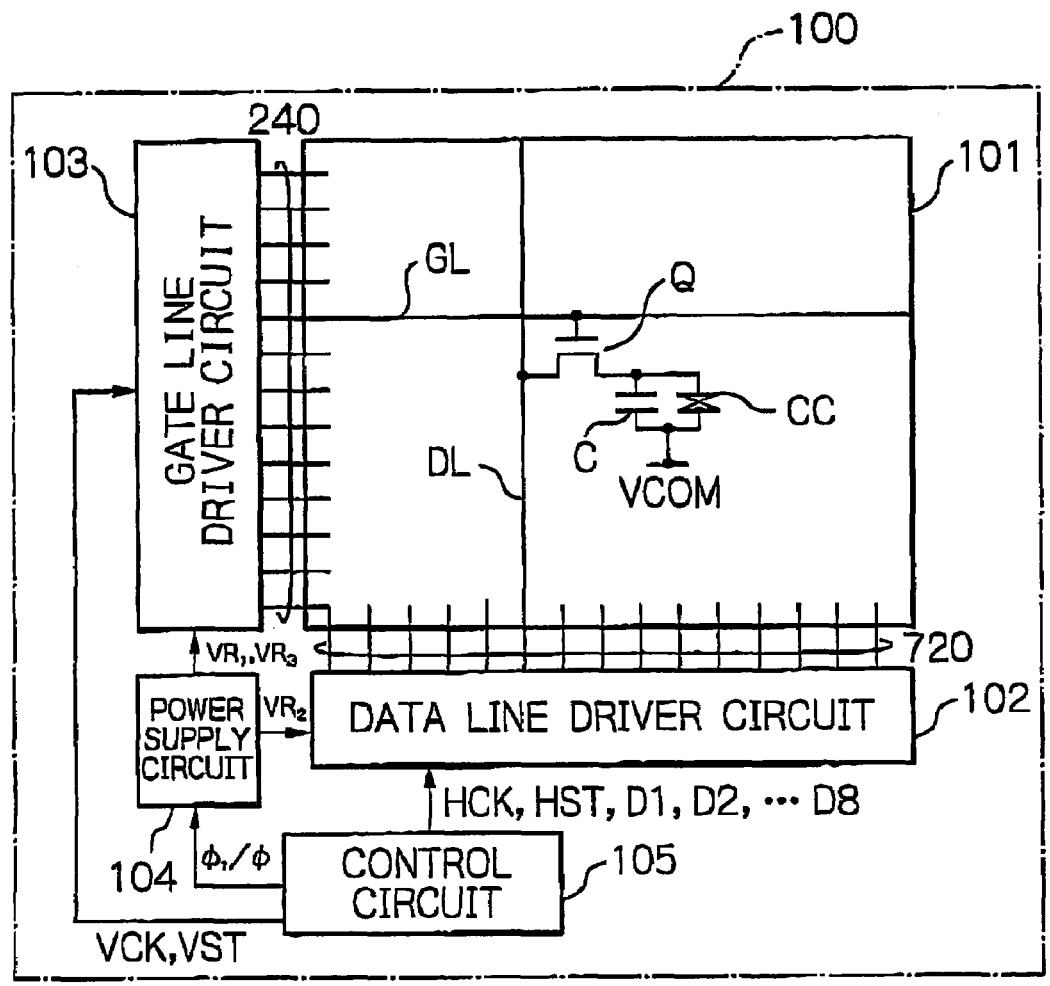
FIG. 1 is a block circuit diagram illustrating a conventional LCD apparatus to which a power supply circuit is applied.

In FIG. 1, which illustrates a conventional LCD apparatus to which a prior art power supply circuit is applied, reference numeral 100 designates a glass substrate of an LCD panel 101 having 240×320 pixels (=32 240×3×320 dots), where one pixel is formed by three color dots, for example. In this case, the LCD panel 101 includes 720 (=240×3) data lines (or signal lines) DL and 240 gate lines (or scan lines) GL. One pixel, which is located between the data lines DL and the gate lines CL, is constructed by one thin film transistor (TFT) Q, one pixel capacitor C and one liquid crystal cell CC. A common voltage VCOM is applied to the pixel capacitor C and the liquid crystal cell CC.

A data line driver circuit 102 is provided to drive the 720 data lines DL, while a gate driver circuit 103 is provided to drive the 320 gate lines GL.

Also, a power supply circuit 104 supplies a regulated voltage $VR_2$ to the data line driver circuit 102 and supplies regulated voltages $VR_1$ and $VR_3$ to the gate line driver circuit 103.

Further, a control circuit 105 controls the data line driver circuit 102, the gate line driver circuit 103 and the power supply circuit 104. In this case, the control circuit 105 generates a horizontal clock signal HCK, a horizontal start pulse signal HST, 8-bit data signals D1, D2, . . . , D8 and so on, and transmits them to the data line driver circuit 102. Also, the control circuit 105 generates a vertical clock signal VCK, a vertical start pulse signal VST and so on, and transmits them to the gate line driver circuit 103. Further, the control circuit 105 generates two complementary clock signals φ and/φ and transmits them to the power supply circuit 104.

The data line driver circuit 102, the gate line driver circuit 103, the power supply circuit 104 and the control circuit 105 are constructed by large scale integrated (LSI) circuits which are mounted on the glass substrate 100 of the LCD panel 101 by a chips-on-glass (COG) process or a system-on-glass (SOG) process in order to decrease the manufacturing cost.

In the data line driver circuit 102, a data voltage at each of the data lines DL is applied to the pixel capacitor C and the liquid crystal cell CC does not need to be high; however, a high current drive ability is required for the data voltage at each of the data lines DL for charging and discharging the pixel capacitor C and the liquid crystal cell CC. Therefore, the regulated voltage $VR_2$ supplied to the data line driver circuit 102 is a voltage derived from $2 \cdot V_{DD}$, for example.

On the other hand, in the gate line driver circuit 103, since a selection voltage at each of the gate lines GL is applied to the gate of the TFT Q, a high current drive ability is not required; however, the selection voltage at each of the gate lines GL is sufficiently higher than the threshold voltage of the TFT Q to turn ON the TFT Q, while a non-selection voltage at each of the gate lines GL is sufficiently lower than the voltage at a corresponding data line to turn OFF the TFT Q. Therefore, the regulated voltage $VR_1$ for the selection voltage is a voltage derived from $4 \cdot V_{DD}$, for example, while the regulated voltage $VR_3$ is derived from $(-2) \cdot V_{DD}$, for example.

Figure 2:
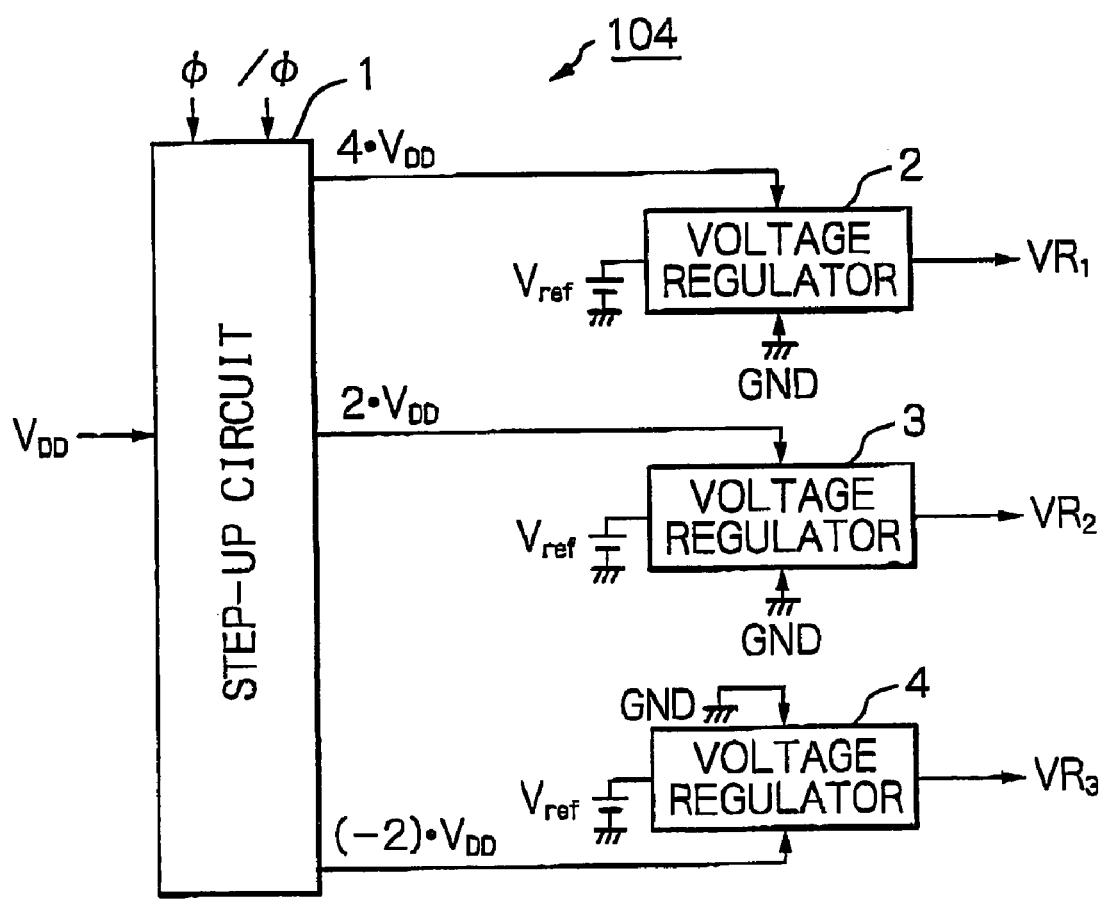
FIG. 2 is a block circuit diagram of the power supply circuit of FIG. 1.

In FIG. 2, which illustrates a detailed circuit diagram of the power supply circuit 104 of FIG. 1, a step-up circuit 1 receives a power supply voltage $V_{DD}$ using clock signals $\phi$ and/$\phi$ to generate voltages of $4 \cdot V_{DD}$, $2 \cdot V_{DD}$ and $(-2) \cdot V_{DD}$.

A voltage regulator 2 is powered by the voltage $4 \cdot V_{DD}$ and the ground voltage GND to generate the regulated voltage $VR_1$. Also, a voltage regulator 3 is powered by the voltage $2 \cdot V_{DD}$ and the ground voltage GND to generate the regulated voltage $VR_2$. Further, a voltage regulator 4 is powered by the ground voltage GND and the voltage $(-2) \cdot V_{DD}$ to generate the regulated voltage $VR_3$.

In FIG. 2, a reference voltage $V_{ref}$ is the power supply voltage $V_{DD}$, for example.

Figure 3:
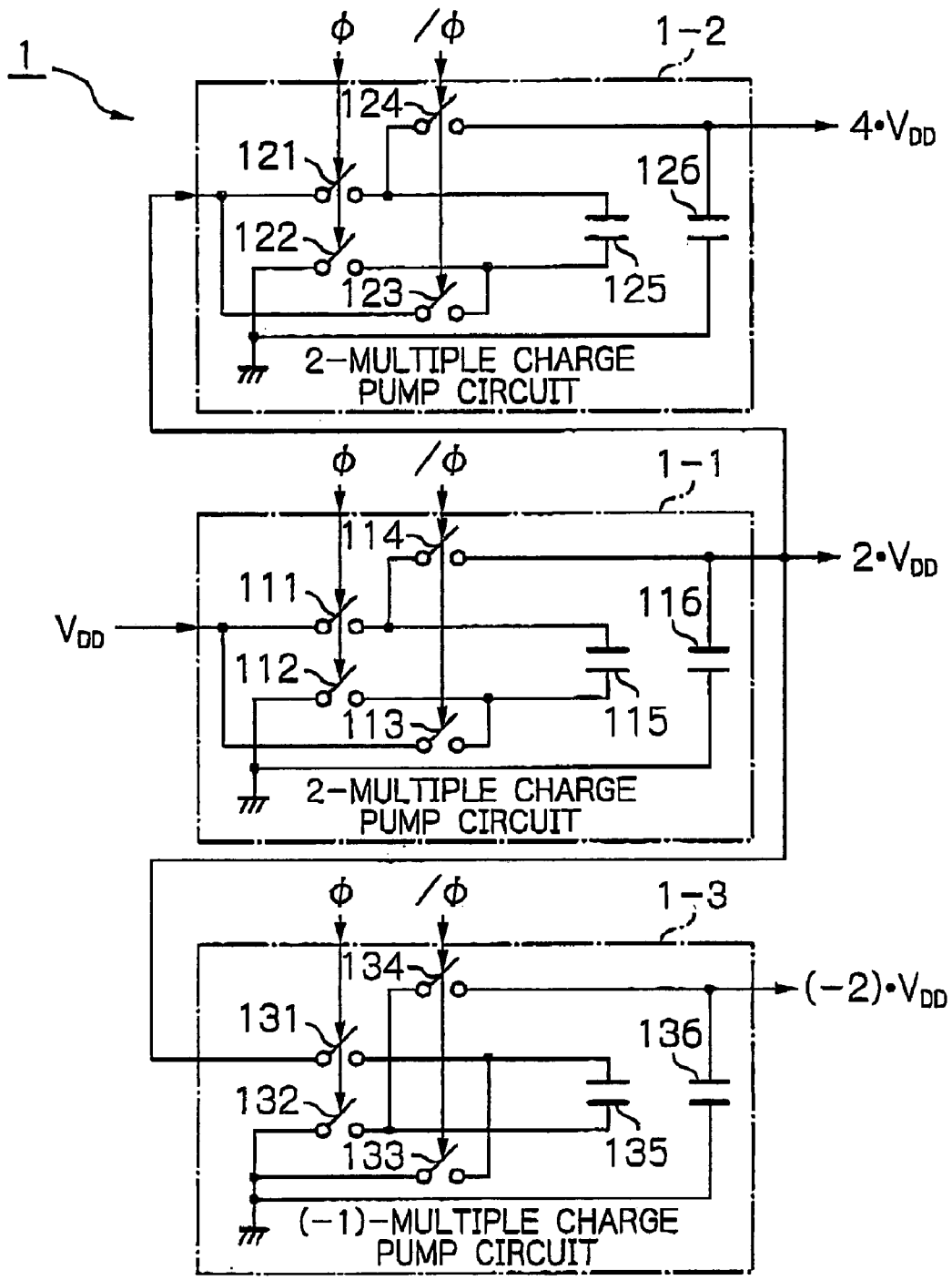
FIG. 3 is a circuit diagram of the step-up circuit of FIG. 2.
Figure 3:
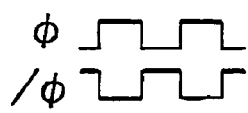

In FIG. 3, which is a detailed circuit diagram of the step-up circuit 1 of FIG. 2, the step-up circuit 1 is constructed by a 2-multiple charge pump circuit 1-1 for receiving the voltage $V_{DD}$ clocked by the clock signals $\phi$ and/$\phi$ to generate a voltage of $2 \cdot V_{DD}$, a 2-multiple charge pump circuit 1-2 for receiving the voltage $2 \cdot V_{DD}$, from the 2-multiple charge pulp circuit 1 clocked by the clock signals $\phi$ and/$\phi$ to generate $4 \cdot V_{DD}$, and a (−1)-multiple charge pump circuit 1-3 for receiving the voltage $2 \cdot V_{DD}$ from the 2-multiple charge pump circuit 1-1 to generate a voltage of $(-2) \cdot V_{DD}$.

The 2-multiple charge pump circuit 1-1 is constructed by charging switches 111 and 112 clocked by the clock signal $\phi$, a step-up switch 113 clocked by the clock signal/$\phi$ and an output switch 114 clocked by the clock signal/$\phi$, a step-up capacitor 115 and a smoothing capacitor 116. First, when the clock signals $\phi$ and/$\phi$ are high and low, respectively, the switches 111 and 112 are turned ON and the switches 113 and 114 are turned OFF, so that the capacitor 115 is charged at $V_{DD}$. Next, when the clock signals $\phi$ and/$\phi$ are low and high, respectively, the switches 111 and 112 are turned OFF and the switches 113 and 114 are turned ON, so that the voltage $V_{DD}$ is added to the output voltage $V_{DD}$ of the capacitor 115, thus generating the voltage $2 \cdot V_{DD}$.

The 2-multiple charge pump circuit 1-2 is constructed by charging switches 121 and 122 clocked by the clock signal $\phi$, a step-up switch 123 clocked by the clock signal/$\phi$ and an output switch 124 clocked by the clock signal/$\phi$, a step-up capacitor 125 and a smoothing capacitor 126. First, when the clock signals $\phi$ and/$\phi$ are high and low, respectively, the switches 121 and 122 are turned ON and the switches 123 and 124 are turned OFF, so that the capacitor 125 is charged at $2 \cdot V_{DD}$. Next, when the clock signals $\phi$ and/$\phi$ are low and high, respectively, the switches 121 and 122 are turned OFF and the switches 123 and 124 are turned ON, so that the voltage $2 \cdot V_{DD}$ is added to the output voltage $2 \cdot V_{DD}$ of the capacitor 125, thus generating the voltage $4 \cdot V_{DD}$.

The (−1)-multiple charge pump circuit 1-3 is constructed by charging switches 131 and 132 clocked by the clock signal $\phi$, a step-down switch 133 clocked by the clock signal/$\phi$ and an output switch 134 clocked by the clock signal/$\phi$, a step-up capacitor 135 and a smoothing capacitor 136. First, when the clock signals $\phi$ and/$\phi$ are high and low, respectively, the switches 131 and 132 are turned ON and the switches 133 and 134 are turned OFF, so that the capacitor 135 is charged at $2 \cdot V_{DD}$. Next, when the clock signals $\phi$ and/$\phi$ are low and high, respectively, the switches 131 and 132 are turned OFF and the switches 133 and 134 are turned ON, so that the voltage $2 \cdot V_{DD}$ is subtracted from the output voltage GND of the capacitor 135, thus generating the voltage $(-2) \cdot V_{DD}$.

In FIG. 3, the switches 111, 112, 113, 114, 121, 122, 123, 124, 131, 132, 133 and 134 can be formed by N-channel MOS transistors. Also, if the switches 111, 112, 121, 122, 131 and 132 are formed by N-channel MOS transistors and the switches 113, 114, 123, 124, 133 and 134 are formed by P-channel MOS transistors, the clock signals $\phi$ and/$\phi$ are replaced by a single clock signal $\phi$.

Figure 4:
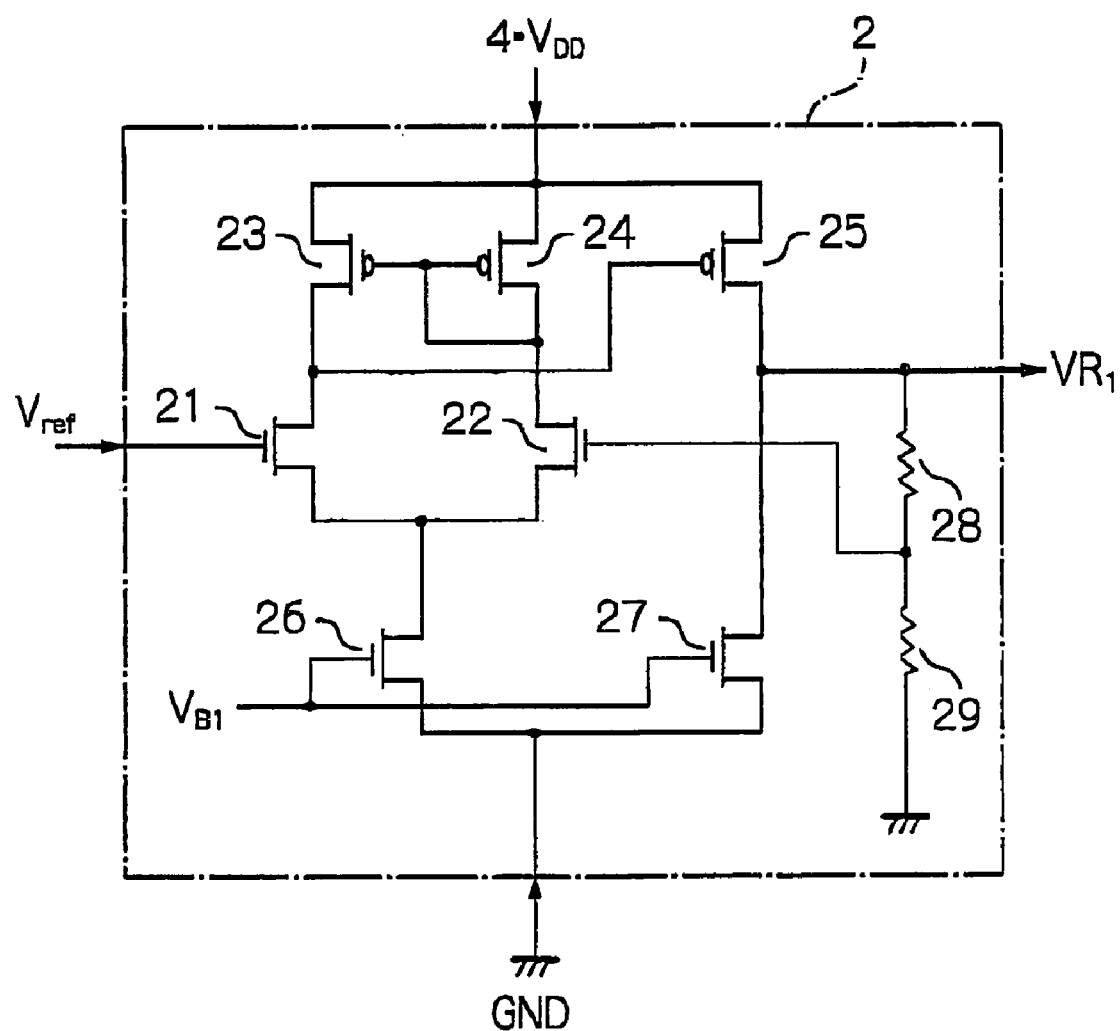
FIGS. 4, 5 and 6 are circuit diagrams of the voltage regulators of FIG. 2.
Figure 7:
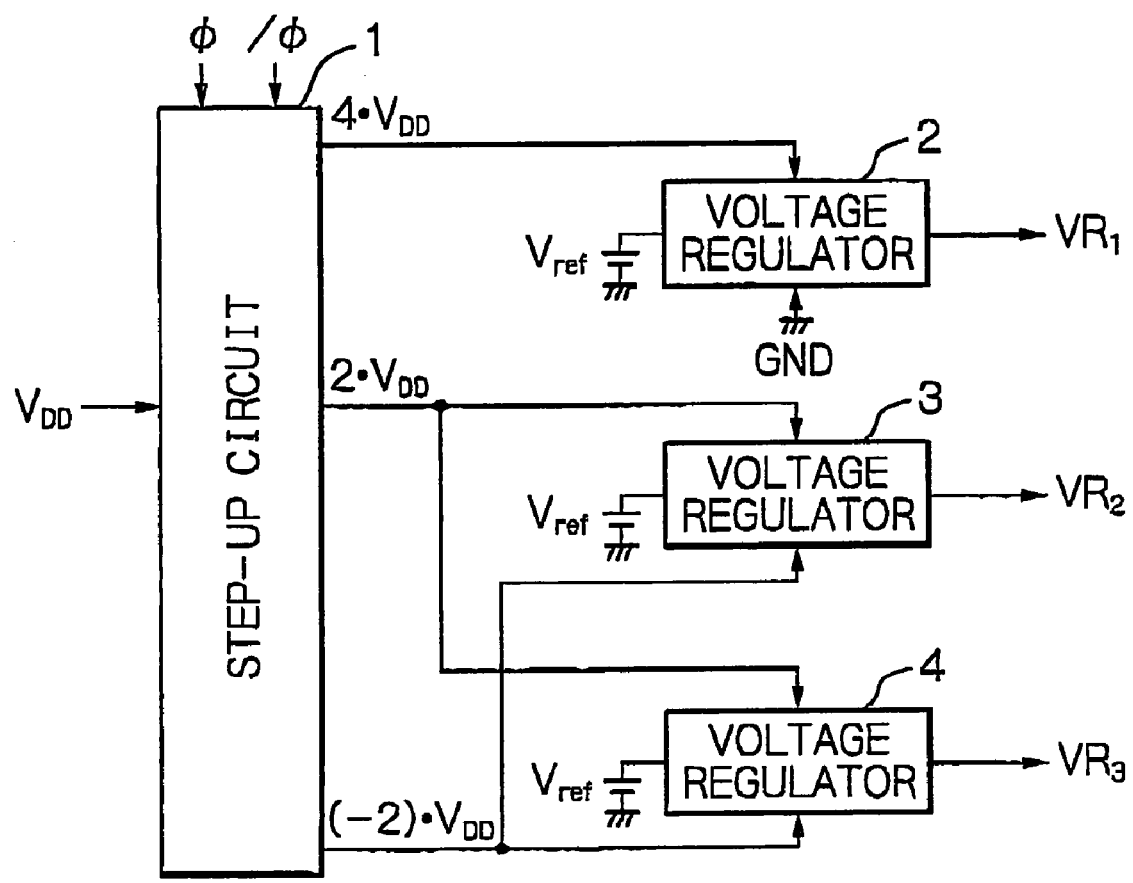
FIG. 7 is a block circuit diagram illustrating a first embodiment of the power supply circuit according to the present invention.

In FIG. 4, which illustrates a detailed circuit diagram of the voltage regulator 2 of FIG. 2 (see: FIG. 7 of JP-A-2002-189454), the voltage regulator 2 is of a differential amplifier type which is constructed by a differential pair formed by N-channel MOS transistors 21 and 22, a load circuit connected to the differential pair formed by P-channel MOS transistors 23 and 24 forming a current mirror circuit, an output P-channel MOS transistor 25 for generating the regulated voltage $VR_1$, and constant current sources formed by N-channel MOS transistors 26 and 27 whose gates receive a constant bias voltage $V_{B1}$. The transistors 26 and 27 are connected to the differential pair (21, 22) and the transistor 25, respectively. Also, a reference voltage $V_{ref}$ is applied to the gate of the transistor 21, while a voltage of the regulated voltage $VR_1$ divided by resistors 28 and 29 is applied to the gate of the transistor 22. In this case, the voltage regulator 2 of FIG. 4 is powered by the voltage $4 \cdot V_{DD}$ and the ground voltage GND whose difference is $4 \cdot V_{DD}$. Therefore, if a threshold voltage of the P-channel MOS transistors is defined by $V_{thp}$ and a threshold voltage of the N-channel NOS transistors is defined by $V_{thn}$, the difference $4 \cdot V_{DD}$ is required to be larger than $3 \cdot V_{th}$ where $|V_{thp}|=V_{thn}=V_{th}$, to stabilize the operation of the voltage regulator 2, thus obtaining the following:

$$V_{ref}=(R_{29}/(R_{28}+R_{29})) \cdot VR_1$$

$$\therefore VR_1=((R_{28}+R_{29})/R_{29}) \cdot V_{ref} \qquad (1)$$

where $R_{28}$ and $R_{29}$ are resistance values of the resistors 28 and 29, respectively.

Figure 5:
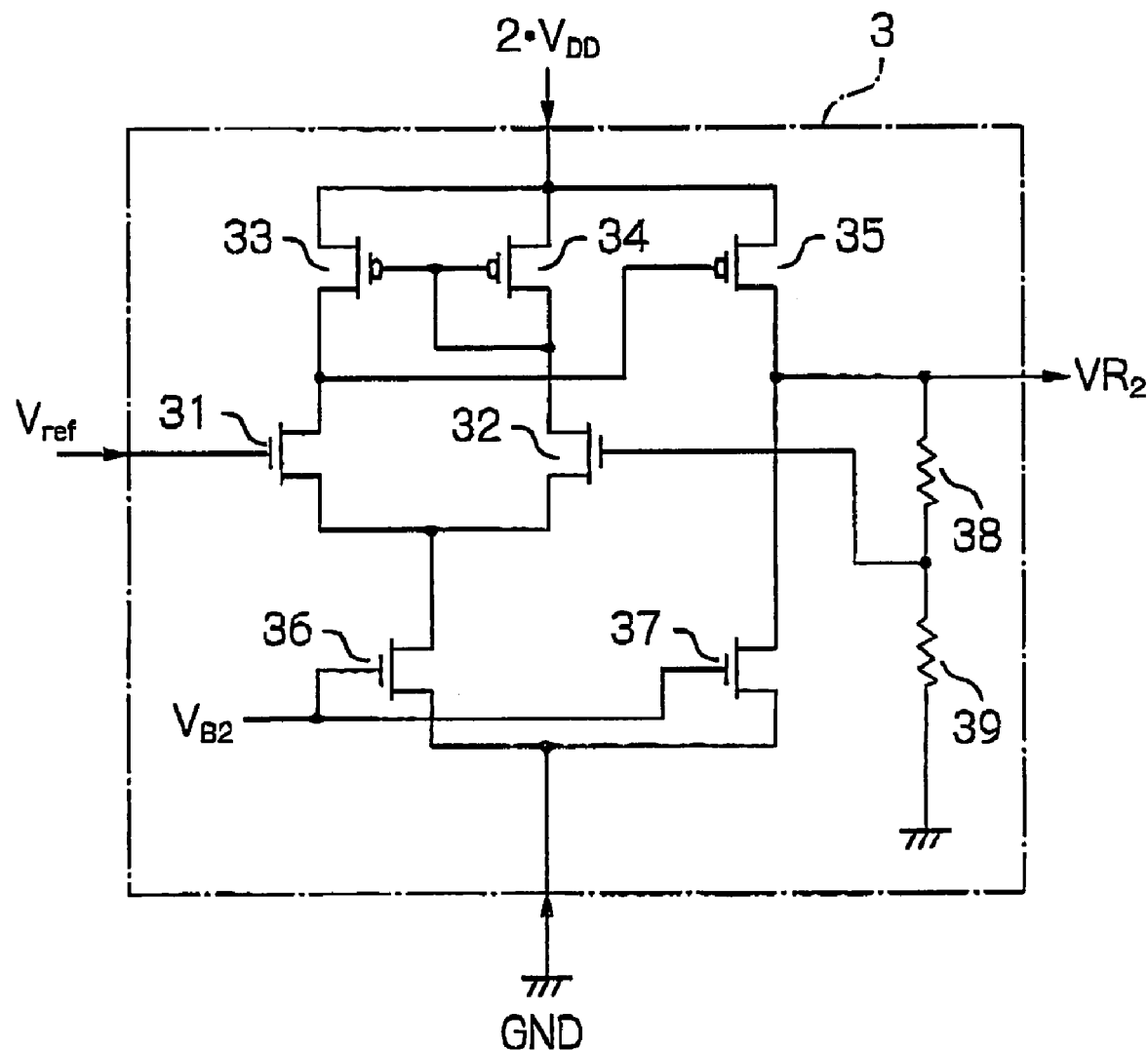

In FIG. 5, which illustrates a detailed circuit diagram of the voltage regulator 3 of FIG. 2, the voltage regulator 3 has a similar configuration to that of the voltage regulator 2 of FIG. 4. That is, the voltage regulator 3 is constructed by a differential pair formed by N-channel MOS transistors 31 and 32, a load circuit connected to the differential pair formed by P-channel MOS transistors 33 and 34 forming a current mirror circuit, an output P-channel MOS transistor 35 for generating the regulated voltage $VR_2$, and constant current sources formed by N-channel MOS transistors 36 and 37 whose gates receive a constant bias voltage $V_{B2}$. The transistors 36 and 37 are connected to the differential pair (31, 32) and the transistor 35, respectively. Also, the reference voltage $V_{ref}$ is applied to the gate of the transistor 31, while a voltage of the regulated voltage $VR_2$ divided by resistors 38 and 39 is applied to the gate of the transistor 32. In this case, the voltage regulator 3 of FIG. 5 is powered by the voltage $2 \cdot V_{DD}$ and the ground voltage GND whose difference is $2 \cdot V_{DD}$. Therefore, if a threshold voltage of the P-channel MOS transistors is defined by $V_{thp}$ and a threshold voltage of the N-channel MOS transistors is defined by $V_{thn}$, the difference $2 \cdot V_{DD}$ is required to be larger than $3 \cdot V_{th}$ where $|V_{thp}|=V_{thn}=V_{th}$, to stabilize the operation of the voltage regulator 3, thus obtaining the following:

$$V_{ref}=(R_{39}/(R_{38}+R_{39})) \cdot VR_2$$

$$\therefore VR_2=((R_{38}+R_{39})/R_{39}) \cdot V_{ref} \quad (2)$$

where $R_{38}$ and $R_{39}$ are resistance values of the resistors 38 and 39, respectively.

Figure 6:
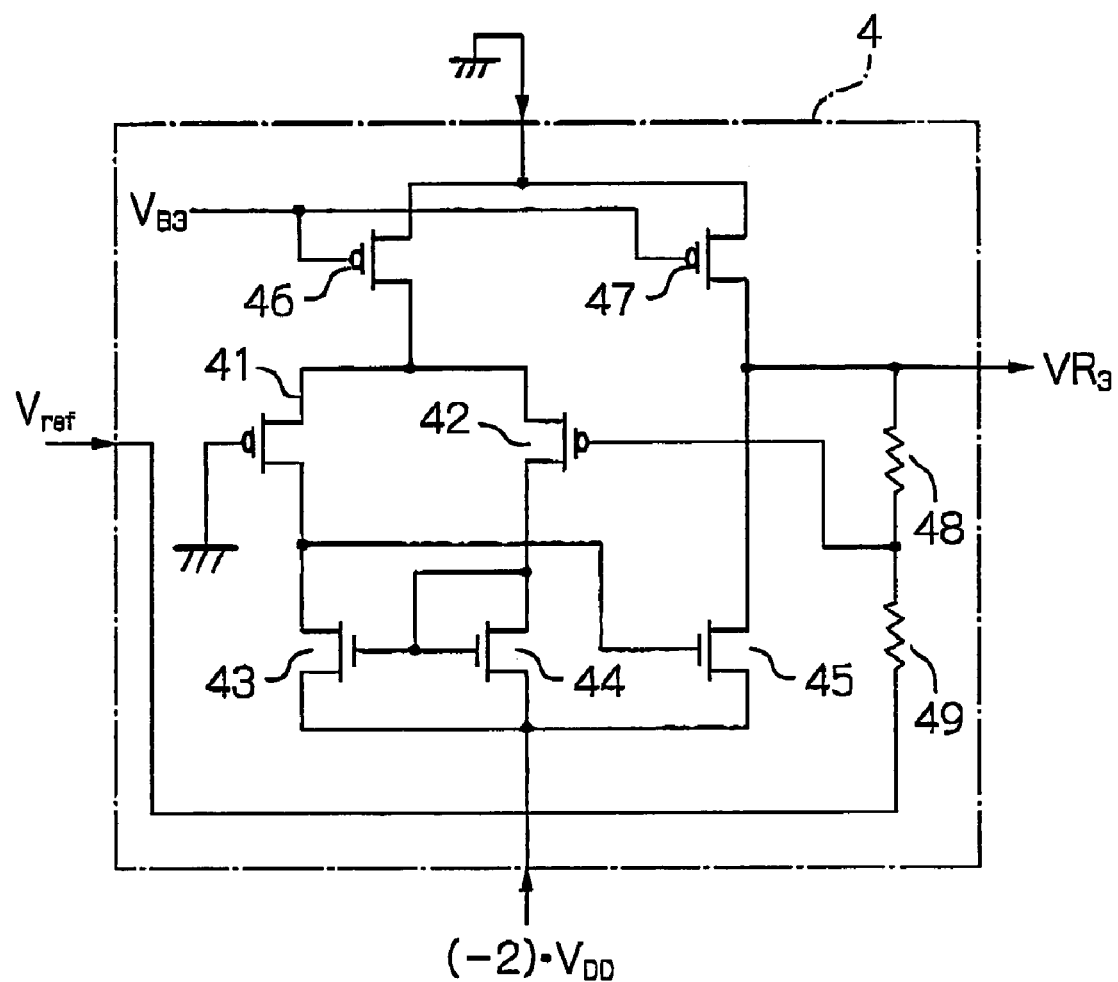

In FIG. 6, which illustrates a detailed circuit diagram of the voltage regulator 4 of FIG. 2, the voltage regulator 4 is of a differential amplifier type which is constructed by a differential pair formed by P-channel MOS transistors 41 and 42, a load circuit connected to the differential pair formed by N-channel MOS transistors 43 and 44 forming a current mirror circuit, an output N-channel MOS transistor 45 for generating the regulated voltage $VR_3$, and constant current sources formed by P-channel MOS transistors 46 and 47 whose gates receive a constant bias voltage $V_{B3}$. The transistors 46 and 47 are connected to the differential pair (41, 42) and the transistor 45, respectively. Also, the ground voltage GND is applied to the gate of the transistor 41, while a difference between reference voltage $V_{ref}$ and the regulated voltage $VR_3$, divided by resistors 48 and 49, is applied to the gate of the transistor 42. In this case, the voltage regulator 4 of FIG. 6 is powered by the ground voltage GND and the voltage $(-2) \cdot V_{DD}$ whose difference is $2 \cdot V_{DD}$. Therefore, if a threshold voltage of the P-channel MOS transistors is defined by $V_{thp}$ and a threshold voltage of the N-channel MOS transistors is defined by $V_{thn}$, the difference $2 \cdot V_{DD}$ is required to be larger than $3 \cdot V_{th}$ where $|V_{thp}|=V_{thn}=V_{th}$, to stabilize the operation of the voltage regulator 4, thus obtaining the following:

$$V_{ref}=(R_{49}/(R_{48}+R_{49})) \cdot (VR_3-V_{ref})$$

$$VR_1=((R_{48}+2 \cdot R_{49})/R_{49}) \cdot V_{ref} \quad (3)$$

where $R_{48}$ and $R_{49}$ are resistance values of the resistors 48 and 49, respectively.

For example, the resistance values $R_{28}$, $R_{29}$, $R_{38}$, $R_{39}$, $R_{48}$ and $R_{49}$ of the resistors 28, 29, 38, 39, 48 and 49 are adjusted to satisfy the following:

$$VR_1=2 \cdot VR_2$$

$$VR_3=-VR_2$$

Thus, in FIG. 2, the voltage regulator 2 is powered by the large voltage difference $4 \cdot V_{DD}$, the voltage regulator 3 is powered by the small voltage difference $2 \cdot V_{DD}$, and the voltage regulator 4 is powered by the small voltage difference $2 \cdot V_{DD}$.

Therefore, if the threshold voltages of the MOS transistors of the voltage regulator 2 are the same as those of the voltage regulators 3 and 4, the absolute values of the threshold voltages of the MOS transistors need to be sufficiently small to operate the MOS transistors of the voltage regulators 3 and 4 powered by the small voltage difference $2 \cdot V_{DD}$. However, generally, in MOS transistors, the smaller the absolute value of the threshold voltage, the smaller the breakdown voltage. As a result, the MOS transistors of the voltage regulator 2 powered by the large voltage difference $4 \cdot V_{DD}$ are easily broken down, thus deteriorating the reliability.

Note that since TFTs used in the LCD panel 101 of FIG. 1 generally have large absolute threshold voltages, the MOS transistors having such small absolute threshold voltages cannot be replaced by TFTs, which would increase the manufacturing cost of the LCD apparatus of FIG. 1.

Note that the absolute threshold voltages of the MOS transistors of the voltage regulator 2 can be higher than those of the voltage regulators 3 and 4 to improve the breakdown characteristics of the voltage regulator 2; however, this would increase the manufacturing cost.

In FIG. 7, which illustrates a first embodiment of the power supply circuit according to the present invention, the voltage regulator 3 of FIG. 2 is powered by the voltage $2 \cdot V_{DD}$ and the voltage $(-2) \cdot V_{DD}$, and the voltage regulator 4 of FIG. 2 is powered by the voltage $2 \cdot V_{DD}$ and the voltage $(-2) \cdot V_{DD}$. That is, all the voltage regulators 2, 3 and 4 are powered by the large voltage difference $4 \cdot V_{DD}$.

Thus, the absolute threshold voltages of the MOS transistors of all the voltage regulators 2, 3 and 4 can be increased to operate the MOS transistors, so that the breakdown voltage can be enhanced. Also, in this case, since the MOS transistors can be replaced by TFTs having large absolute threshold voltages, the manufacturing cost of the LCD apparatus of FIG. 1 would be decreased. Note that the step-up circuit 1 of FIG. 1 can also be formed by TFTs, which further would decrease the manufacturing cost of the LCD apparatus of FIG. 1.

Figure 8:
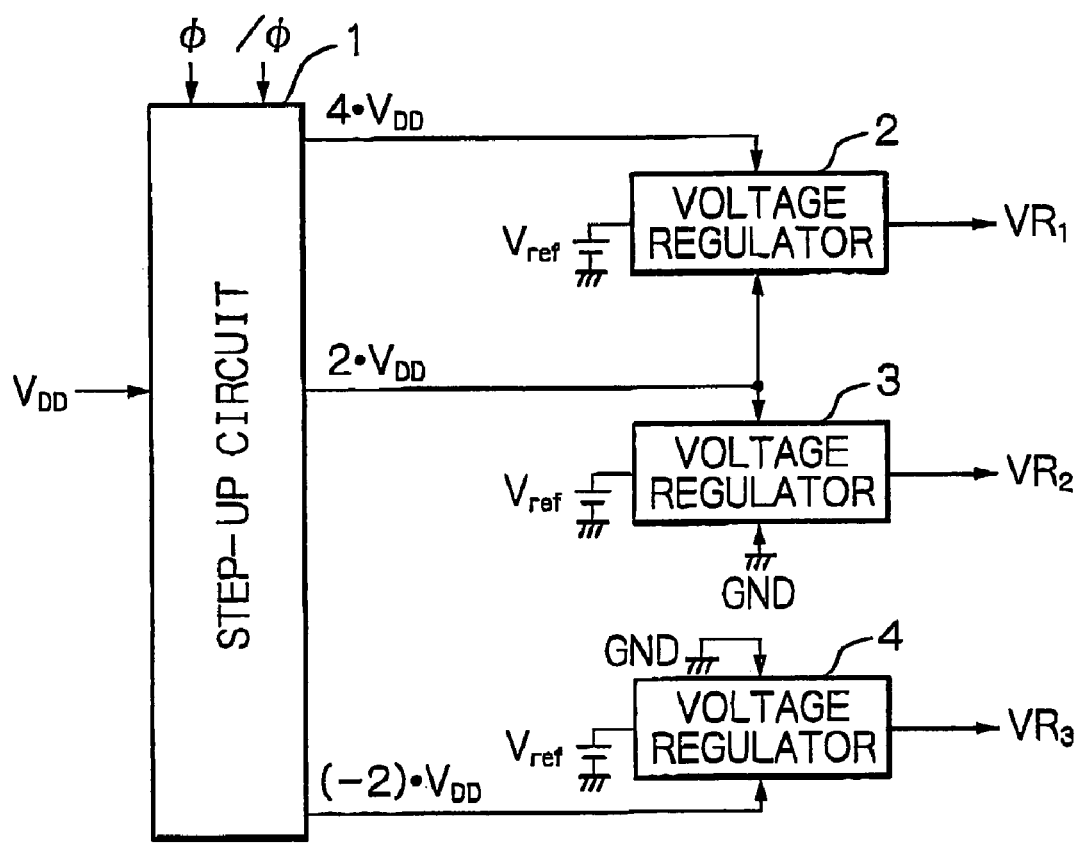
FIG. 8 is a block circuit diagram illustrating a second embodiment of the power supply circuit according to the present invention.

In FIG. 8, which illustrates a second embodiment of the power supply circuit according to the present invention, the voltage regulator 2 of FIG. 2 is powered by the voltage $4 \cdot V_{DD}$ and the voltage $2 \cdot V_{DD}$. That is, all the voltage regulators 2, 3 and 4 are powered by the small voltage difference $2 \cdot V_{DD}$.

Thus, the absolute threshold voltages of the MOS transistors of all the voltage regulators 2, 3 and 4 can be decreased to operate the MOS transistors. In this case, the breakdown voltage is decreased; however, this would create no problem, since all the voltage regulators 2, 3 and 4 are powered by the small voltage difference.

Figure 9:
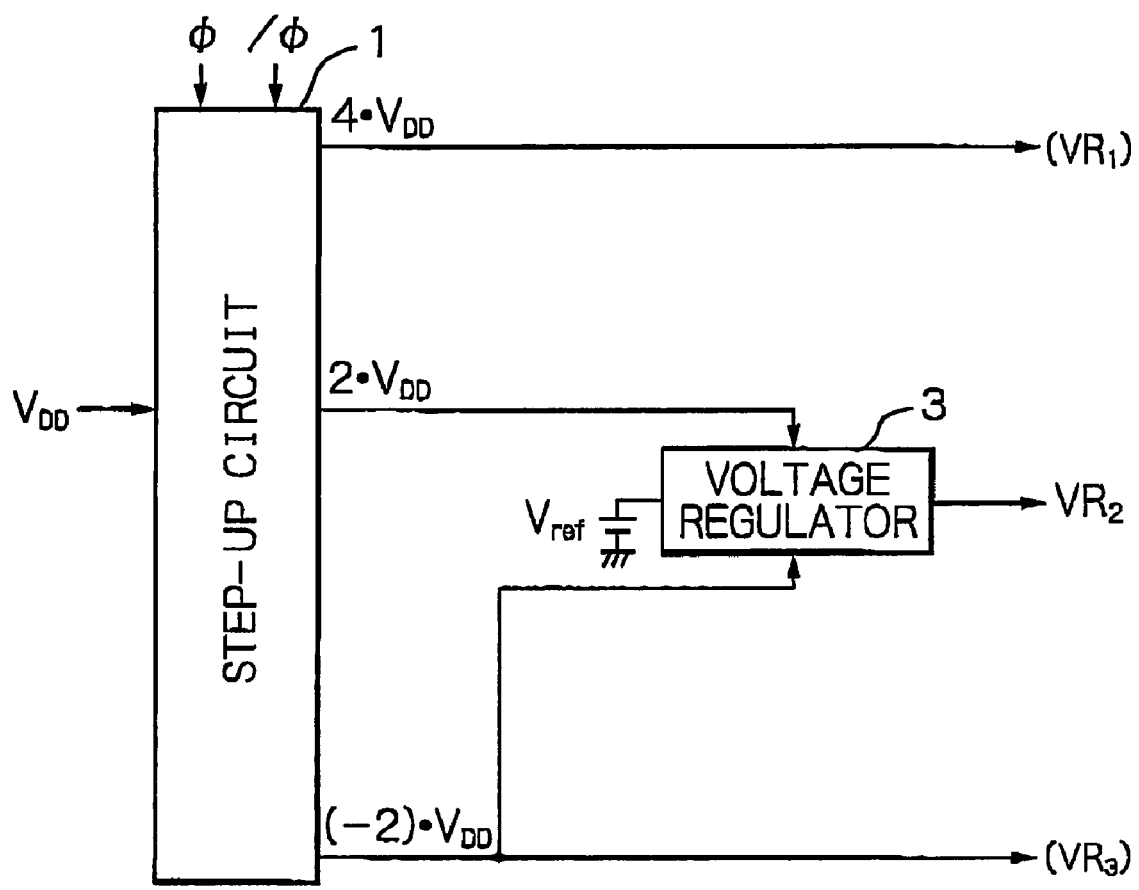
FIG. 9 is a block circuit diagram illustrating a third embodiment of the power supply circuit according to the present invention.

In FIG. 9, which illustrates a third embodiment of the power supply circuit according to the present invention, the regulated voltages $VR_1$ and $VR_3$ of FIG. 7 are not used; the voltage $4 \cdot V_{DD}$ and the voltage $(-2) \cdot V_{DD}$ are supplied directly to the gate line driver circuit 103 of FIG. 1. That is, in the gate line driver circuit 103, a high current drive ability is not required as explained above, and also, the power consumption is small and the fluctuation of supplied currents is small. Therefore, the gate lines GL can be driven directly by the voltage $4 \cdot V_{DD}$ and $(-2) \cdot V_{DD}$.

Thus, in FIG. 9, since the voltage regulators 2 and 4 of FIG. 7 are unnecessary, the manufacturing cost of the LCD apparatus of FIG. 1 can be decreased.

As explained hereinabove, according to the present invention, all the voltage regulators can be stably operated and, also, the reliability can be improved.

The invention claimed is:

1. A power supply circuit comprising:
   a step-up circuit for receiving an input DC voltage to generate a plurality of output DC voltages; and
   a plurality of voltage regulators, each powered by two voltages selected from among said plurality of output DC voltages and a ground voltage, wherein the two voltages selected for a first one of said plurality of voltage regulators have a first voltage difference, an output DC voltage of said first voltage regulator being between the two voltages of said first voltage regulator, and the two voltages respectively selected for each other one of said plurality of voltage regulators have a respective voltage difference, an output DC voltage of said each other voltage regulator being between the two voltages of said each other voltage regulator, a difference between the two voltages of each of said voltage regulators being substantially the same, to stably operate said voltage regulators.

2. The power supply circuit as set forth in claim 1, wherein said step-up circuit comprises a plurality of charge pump circuits each for generating one of said output DC voltages.

3. The power supply circuit as set forth in claim 2, wherein said charge pump circuits comprise MOS transistors.

4. A power supply circuit comprising:
a step-up circuit for receiving an input DC voltage to generate a plurality of output DC voltages; and
a plurality of voltage regulators, each powered by two voltages selected from among said plurality of output DC voltages and a ground voltage,
wherein the two voltages selected for a first one of said plurality of voltage regulators have a first voltage difference, an output DC voltage of said first voltage regulator being between the two voltages of said first voltage regulator, and the two voltages respectively selected for each other one of said plurality of voltage regulators have a respective voltage difference, an output DC voltage of said each other voltage regulator being between the two voltages of said each other voltage regulator, a difference between the two voltages of each of said voltage regulators being substantially the same, to stably operate said voltage regulators,
wherein said charge pump circuits comprise thin film transistors.

5. The power supply circuit as set forth in claim 1, wherein each of said voltage regulators comprises a differential amplifier comprised of MOS transistors.

6. The power supply circuit as set forth in claim 4, wherein each of said voltage regulators comprises a differential amplifier comprised of thin film transistors.

7. A power supply circuit comprising:
a step-up circuit for receiving a power supply voltage to generate a first step-up voltage, a second step-up voltage lower than said first step-up voltage and higher than the ground voltage, and a third step-up voltage lower than the ground voltage;
a first voltage regulator, powered by said first step up voltage and the ground voltage, for generating a first regulated voltage;
a second voltage regulator, powered by said second step-up voltage and said third step-up voltage, for generating a second regulated voltage; and
a third voltage regulator, powered by said second step up voltage and the third step-up voltage, for generating a third regulated voltage.

8. The power supply circuit as set forth in claim 7, wherein said step-up circuit comprises:
a first charge pump circuit for receiving said power supply voltage to generate said second step-up voltage;
a second charge pump circuit, connected to said first charge pump circuit, for receiving said second step-up voltage to generate said first step-up voltage; and
a third charge pump circuit, connected to said first charge pump circuit, for receiving said second step-up voltage to generate said third step-up voltage.

9. The power supply circuit as set forth in claim 8, wherein said first charge pump circuit comprises a 2-multiple charge pump circuit,
said second charge pump circuit comprising a 2-multiple charge pump circuit,
said third charge pump circuit comprising a (−1)-multiple charge pump circuit.

10. The power supply circuit as set forth in claim 8, wherein said first, second and third charge pump circuits comprise MOS transistors.

11. The power supply circuit as set forth in claim 8, wherein said first, second and third charge pump circuits comprise thin film transistors.

12. The power supply circuit as set forth in claim 7, wherein each of said first, second and third voltage regulators comprises a differential amplifier comprised of MOS transistors.

13. The power supply circuit as set forth in claim 7, wherein each of said first, second and third voltage regulators comprises a differential amplifier comprised of thin film transistors.

14. The power supply circuit as set forth in claim 7, wherein said second regulated voltage is supplied to a data line driver circuit of a liquid crystal display apparatus and said first and third regulated voltages are supplied to a gate line driver circuit of said liquid crystal display apparatus.

15. A power supply circuit comprising:
a step-up circuit for receiving a power supply voltage to generate a first step-up voltage, a second step-up voltage lower than said first step-up voltage and higher than the ground voltage, and a third step-up voltage lower than the ground voltage;
a first voltage regulator, powered by said first step-up voltage and said second step-up voltage, for generating a first regulated voltage;
a second voltage regulator, powered by said second step-up voltage and the ground voltage, for generating a second regulated voltage; and
a third voltage regulator, powered by the ground voltage and the third step-up voltage, for generating a third regulated voltage.

16. The power supply circuit as set forth in claim 15, wherein said step-up circuit comprises:
a first charge pump circuit for receiving said power supply voltage to generate said second step-up voltage;
a second charge pump circuit, connected to said first charge pump circuit, for receiving said second step-up voltage to generate said first step-up voltage; and
a third charge pump circuit, connected to said first charge pump circuit, for receiving said second step-up voltage to generate said third step-up voltage.

17. The power supply circuit as set forth in claim 16, wherein said first charge pump circuit comprises a 2-multiple charge pump circuit,
said second charge pump circuit comprising a 2-multiple charge pump circuit,
said third charge pump circuit comprising a (−1)-multiple charge pump circuit.

18. The power supply circuit as set forth in claim 16, wherein said first, second and third charge pump circuits comprise MOS transistors.

19. The power supply circuit as set forth in claim 16, wherein said first, second and third charge pump circuits comprise thin film transistors.

20. The power supply circuit as set forth in claim 15, wherein each of said first, second and third voltage regulators comprises a differential amplifier comprised of MOS transistors.

21. The power supply circuit as set forth in claim 15, wherein each of said first, second and third voltage regulators comprises a differential amplifier comprised of thin film transistors.

22. The power supply circuit as set forth in claim 15, wherein said second regulated voltage is supplied to a data line driver circuit of a liquid crystal display apparatus and said first and third regulated voltages are supplied to a gate line driver circuit of said liquid crystal display apparatus.

23. A power supply circuit comprising:
a step-up circuit for receiving a power supply voltage to generate a first step-up voltage, a second step-up voltage lower than said first step-up voltage and higher than the ground voltage, and a third step-up voltage lower than the ground voltage; and
a voltage regulator, powered by said second step-up voltage and said third step-up voltage, for generating a regulated voltage,
said regulated voltage being supplied to a data line driver circuit of a liquid crystal display apparatus,
said first and third step-up voltages being supplied to a gate line driver circuit of said liquid crystal display apparatus.

24. The power supply circuit as set forth in claim 23, wherein said step-up circuit comprises:
a first charge pump circuit for receiving said power supply voltage to generate said second step-up voltage;
a second charge pump circuit, connected to said first charge pump circuit, for receiving said second step-up voltage to generate said first step-up voltage; and
a third charge pump circuit, connected to said first charge pump circuit, for receiving said second step-up voltage to generate said third step-up voltage.

25. The power supply circuit as set forth in claim 24, wherein said first charge pump circuit comprises a 2-multiple charge pump circuit,
said second charge pump circuit comprising a 2-multiple charge pump circuit,
said third charge pump circuit comprising a (−1)-multiple charge pump circuit.

26. The power supply circuit as set forth in claim 24, wherein said first, second and third charge pump circuits comprise MOS transistors.

27. The power supply circuit as set forth in claim 24, wherein said first, second and third charge pump circuits comprise thin film transistors.

28. The power supply circuit as set forth in claim 23, wherein said voltage regulator comprises a differential amplifier comprised of MOS transistors.

29. The power supply circuit as set forth in claim 23, wherein said voltage regulator comprises a differential amplifier comprised of thin film transistors.

30. The power supply circuit as set forth in claim 1, wherein said output DC voltages are $4 \cdot V_{DD}$, $2 \cdot V_{DD}$ and $(-2) \cdot V_{DD}$ where $V_{DD}$ is said input DC voltage.

* * * * *